March 26, 1963 — L. R. MOSKOWITZ — 3,082,982
STAFF SUPPORT OR THE LIKE
Filed Oct. 17, 1960
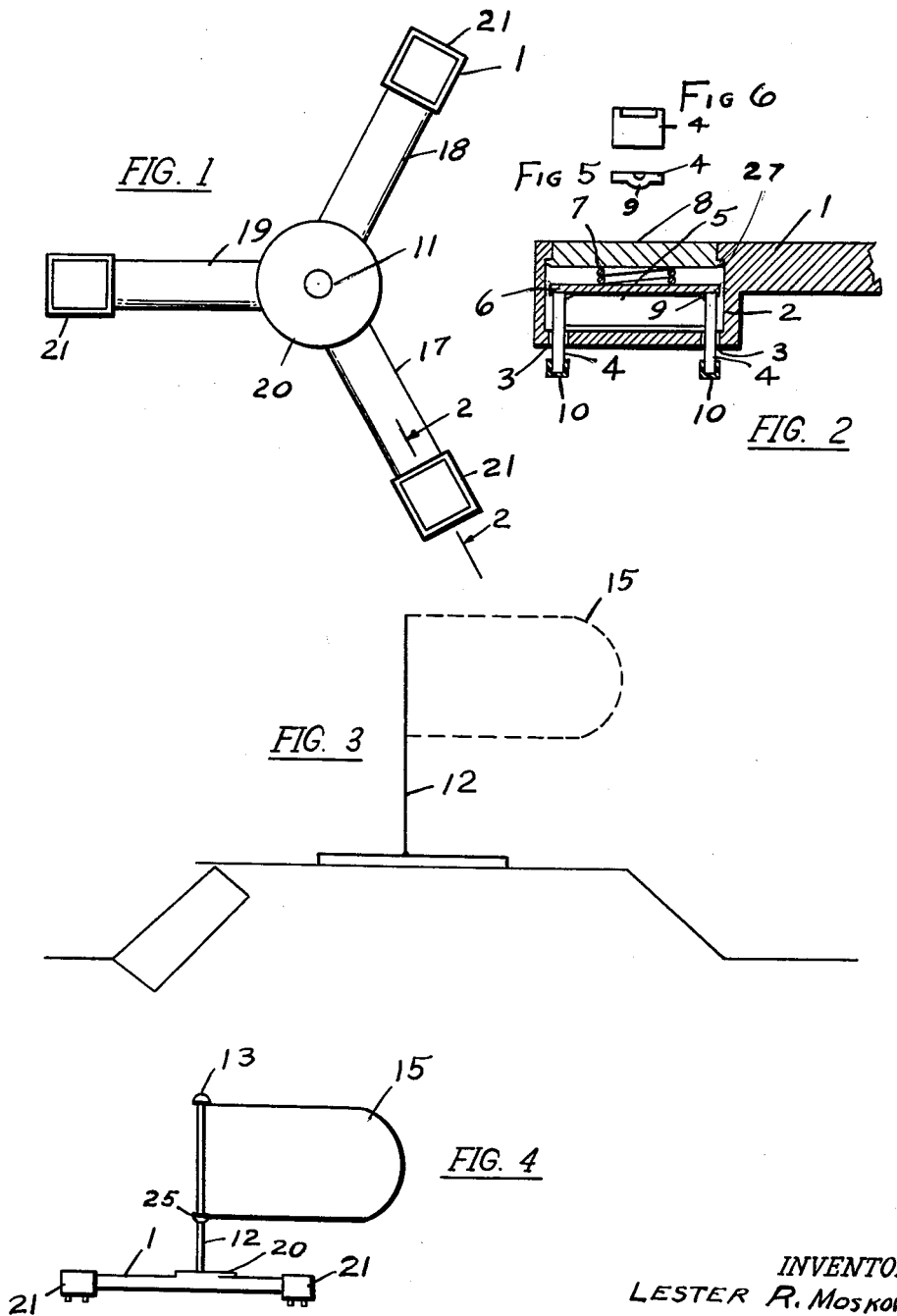
INVENTOR
LESTER R. MOSKOWITZ

United States Patent Office 3,082,982
Patented Mar. 26, 1963

3,082,982
STAFF SUPPORT OR THE LIKE
Lester R. Moskowitz, Erie, Pa., assignor to Zeta-Northern Co., Erie, Pa., a corporation of Pennsylvania
Filed Oct. 17, 1960, Ser. No. 63,071
2 Claims. (Cl. 248—44)

This invention relates to signalling devices and, more particularly, to devices for supporting a magnetic flag on an automobile or similar vehicle.

It is customary and sometimes required by law in many areas of the United States and Canada to identify funeral processions by means of flags or similar devices attached to some or all of the vehicles in the procession.

Several methods of attachment of these flags are in common usage. The most common types clamp a vertical rod with a suitable banner to the rain gutter of the vehicle. Various clamping arrangements are in common use. Another mechanical type clamps a rod and banner assembly to the small vent window commonly found on modern automobiles.

All of the aforementioned types have numerous limitations. Some of the limitations are:

(a) Since it is located on one side of the car, the unit is not as readily visible from both sides of the vehicle as might be desirable, even with a relatively long flagstaff.

(b) No one type of clamp is entirely satisfactory for all types of automobiles due to variations in rain gutter designs from automobile to automobile for various makes, models, and years. No one type of clamp is truly universal.

(c) Improper use or fit due to an unsatisfactory clamp results in a relatively high rate of loss of these units.

(d) Owners of vehicles in the processions frequently object to the use of clamp-on types because of possible scratching of the vehicle surfaces.

(e) The vent window clamp types are not securely held, with subsequent losses, if the clamps are not properly tightened. On the other hand, over-tighening of the clamps may crack, chip, or otherwise damage the vent window of a vehicle.

(f) The relative slowness of placing units on the vehicles by the funeral director's assistants presents difficulties in properly marking the automobiles in the procession. A similar problem arises when the procession breaks up.

(g) All mechanical types and, in particular, the simple spring loaded types, wear out from repeated use and are either lost or require periodic replacement.

Other funeral flags having permanent magnet attaching means have been suggested in an attempt to overcome the above limitations. All of these magnetic units have had certain limitations, one being that no support has been succesfully developed which can utilize the accepted standard cloth banner and which will not blow off at the maximum expected speed which may be encountered in a funeral procession, which is approximately sixty miles per hour. In the case of one design, a cloth banner of medium weight is used but it is reinforced with a stiff wire around its periphery to prevent flutter of the banner because, if such flutter takes place, the magnetic elements are not sufficient to secure the unit to the vehicle even at moderate speed which is approximately thirty-five to fifty-five miles per hour. A great many funeral directors consider fluttering of the banner as desirable to attract attention to the procession.

A second design uses a very light nylon banner, virtually of cheesecloth weave, to avoid blowing off. This type does permit flutter but the effectiveness of the banner is largely lost because of its limited visibility.

Also, the magnetic elements required for existing designs are inefficient magnetically, increasing the cost of these units beyond that required to provide proper operation of the device.

It is, accordingly, an object of the invention presented herein to provide an improved funeral flag support which is simple in construction, economical to manufacture, and simple and efficient to use.

Another object of the invention is to provide a magnetic support for a funeral flag which can be utilized to support any type of banner, cloth, or plastic sheet and which will permit the sheet to flutter, even though made of heavy weight cloth, and to be safely operated at high speeds.

Still another object of the invention is to provide a magnetic funeral flag support which can be attached magnetically to a magnetic surface and removed quickly and conveniently therefrom.

Yet another object of the invention is to provide a funeral flag support which will adapt itself to fit the contoured surface of any make, model, style, or year of automobile and which can be used on any part of the automobile where a magnetic surface appears.

A further object of this invention is to provide a funeral flag which will be supported firmly on an automobile surface, yet will not damage the automobile surface in any way.

A still further object of the invention is to provide a funeral flag support which will resist deterioration with age and use.

Yet a further object of the invention is to provide a funeral flag support which can be placed on a vehicle without special care as to position and which will operate equally effectively regardless of position or direction of travel.

It is a further object of the invention to provide an improved funeral flag and support therefor.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a top view of a funeral flag support according to the invention;

FIG. 2 is an enlarged partial longitudinal cross sectional view taken on line 2—2 of FIG. 1;

FIG. 3 is a side view of the support and flag shown in phantom thereon supported on a vehicle top;

FIG. 4 is a side view of the device according to the invention;

FIG. 5 is an end view of one of the pole pieces; and

FIG. 6 is a side view of one of the pole pieces.

Now with more particular reference to the drawing wherein similar index numerals refer to similar parts throughout the several views, the invention is made up of a unique support. The support has a base made up of three legs 17, 18, and 19 radiating from a common member. The legs 17, 18, and 19 may be made of plastic, wood, metal, or other suitable material. To conserve material and yet maintain rigidity, the legs could be cored and made with a cavity 2 at each of the extremities of the legs.

Disposed in each cavity 2 and projecting through slots 3 in a base 1 are two pole pieces 4 made of magnetic material. A permanent magnet 5 is connected at each of its ends to the pole pieces 4 and a spring plate 6 rests on the backs of the magnet and the pole pieces. The spring plate 6 is made of non-magnetic material and a helical spring 7 is supported between a cap 8 and the spring plate 6.

The spring 7 is shown as a helical compression spring but it could be a leaf spring or made of any other suitable material. The spring 7 urges the spring plate 6 away from the cap 8. The cap 8 can be supported in an opening at the top of the cavity 2 and held therein by a suitable bonding agent or adhesive. In the example shown, the cap 8 snaps into place and is held against shoulders 27 by the spring 7.

The magnetic assembly made up of the bar magnets 5, the plate like pole pieces 4 which form pole means, and the spring plate 6 is contained in the cavities 2 and held therein by the cap 8. The spring plate 6 is made of non-magnetic material and it rests on the back of the magnet 5 and has a clearance of approximately one-thirty-second inch at each end between it and the inside of the cavity. This allows the magnet to rock as well as to move in and out and thus adjust to contour.

The pole pieces 4 are made of a soft magnetic material such as cold rolled steel and the ends of the pole pieces are provided with indentations 9, providing a shoulder which overlies the top of the magnet and prevents the pole pieces from falling out. The pole pieces 4 may be plated with chromium, cadmium, nickel, or other suitable plating material to prevent rusting due to exposure to weather. In some cases where desirable, the pole pieces may be provided with a protective plastic coating 10 on the tips which covers the ends thereof beyond and through the slots 3. The pole pieces are not soldered to the magnet because this would introduce a space between them and the magnet and thereby an effective air gap. The plastic tips 10 could be made in the form of cups from rubber, plastic, or the like. They prevent the magnets from scuffing the vehicle body.

The base 1 is further provided with a central hole 11 into which is pressed, cemented, screwed, or otherwise suitably supported a flagstaff 12. The flagstaff 12 is provided with a capping nut 13 and a spacer nut 25 which are optional, depending upon the size of the banner used on the staffs. The assembly consisting of the flagstaff 12 and the base 1 may be made of metal, wood, or plastic and may be formed as one element integrally together. The flagstaff 12 could be integrally attached to the base 1.

A banner 15 may be made of cloth, metal, plastic sheeting, or other suitable material with a suitable loop therein provided at one end to secure the banner 15 to the flagstaff 12. The banner 15 is normally free to rotate about the flagstaff 12 so that it may be easily attached and may be waved freely thereon.

In operation, when the banner 15 is mounted on the flagstaff 12 and this assembly is attached magnetically to a surface and subjected to a wind force, the force may be considered to be concentrated at the center of the flagstaff 12. If the base of the flagstaff 12 is retained by some means or other object as the vehicle body in the present case, the rotational torque will be developed and will attempt to rotate the assembly about the attachment point.

To prevent such rotation without any perfectly rigid attachment to the body requires that another force of equal magnitude and opposite in direction be applied to the flagstaff assembly. The force produced by the wind force is a function of the wind force magnitude (determined by the wind resistance of the assembly) times the distance from the body at which it acts. If the unit does not happen to be placed on the automobile so that one of the legs is directly parallel to the wind direction, the unit separation is not affected since the projection of the effect of the force is developed by the non-parallel legs when subjected to the plane parallel to the wind which will, in substance, provide the necessary forces to hold the unit in place. The projection applies equally to the magnetic automobile body forces.

The base 1 of the unit serves a three fold function:

(1) It becomes the supporting structure for the flagstaff and banner;

(2) It is the containing means for the magnetic elements; and (3) It is a mechanical force producing member when in position on the vehicle body.

When the device is supported on a vehicle body, there is a force exerted by the wind attempting to slide the unit on the body. This is minimized by the relatively high coefficient of friction between the pole pieces and the vehicle body. The frictional force is increased by the attraction of the magnet to the vehicle body and by the force of the wind acting rotationally on the trailing leg of the unit. The resistance of the flagstaff to tipping is a function of both the magnet strength and length of leg.

A further principle of operation of this device is the inherent ability thereof to adapt itself to a contoured surface. Practically all surfaces of an automobile body on which the device may be used are curved surfaces. To assure maximum efficiency of contact both magnetically and mechanically, the device must be able to adjust itself to an unknown curved surface. This adjustment is provided by the three legged arrangement made up of the legs 17, 18, and 19 disposed at approximately one hundred twenty degrees to each other. Therefore, the device is apparently stable and has a tendency to prevent rocking movement.

A further automatic adjustment of the device is provided by the floating action of the magnetic elements. Since the magnetic element is free to both pivot and move inwardly into the cavity, the magnet can change position while remaining substantially firmly attached to the base. Thus, both pole pieces of the magnetic element can be in contact with any curved surface, providing maximum holding force with a minimum amount of magnet. The maximum magnetic holding force with the minimum magnetic element is further provided by using the soft iron pole pieces 4 as part of the magnetic assembly and charging the pole pieces 4 and the magnet 5 as a single unit.

Protection against marring of the automobile surface is provided by the plastic coating 10 covering the pole piece tips. While this coating reduces somewhat the holding power of the magnet, by proper selection of this magnet, the necessary holding forces can be readily provided. It will be seen, therefore, that the diverging or radiating spaced legs 17, 18, and 19 integrally connected by cylindrically extending bosses 20 make a strong supporting device. Each leg has a downwardly extending boss 21 which has a cavity 2 therein which internally receives the pole pieces 4, the magnet 5, the spring plate 6, and the spring 7, all held therein by the cap 8. The flagstaff 12, being supported at the centers of the legs, is held against tipping by the diverging legs.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a flagstaff for supporting a funeral flag and a support therefor, said support comprising a central boss member and three legs radiating therefrom, each said leg being of at least one-half the length of said flagstaff, each said leg terminating at its distal end in an enlarged member extending below said legs, a cavity in each said enlarged member, a permanent magnet loosely supported in each said cavity, pole pieces on each said permanent magnet extending below said enlarged member, and resilient means in each said cavity urging said pole pieces away from said enlarged member.

2. A magnetic member comprising a support, a bar type magnet in said support, plate like magnetic pole piece members magnetically held to the ends of said magnet, a shoulder on each said plate like pole member overlying one edge of said bar magnet, a plate overlying one side of said magnet and the ends of said pole members adjacent said shoulder, and a resilient member engaging said plate and said support, urging said pole members outwardly.

References Cited in the file of this patent

UNITED STATES PATENTS

| | | |
|---|---|---|
| 821,999 | Frost | May 29, 1906 |
| 1,096,869 | Thorpe | May 19, 1914 |
| 2,457,421 | Warren | Dec. 28, 1948 |
| 2,709,245 | Schneider | May 24, 1955 |
| 2,875,324 | Camp | Feb. 24, 1959 |

FOREIGN PATENTS

| | | |
|---|---|---|
| 1,065,043 | France | Dec. 30, 1953 |
| 548,037 | Italy | Sept. 18, 1956 |